(12) United States Patent
Tsujihiro

(10) Patent No.: US 11,914,326 B2
(45) Date of Patent: Feb. 27, 2024

(54) MAGNETIC TONER

(71) Applicant: KYOCERA Document Solutions Inc., Osaka (JP)

(72) Inventor: Masami Tsujihiro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 304 days.

(21) Appl. No.: 17/327,359

(22) Filed: May 21, 2021

(65) Prior Publication Data
US 2021/0364940 A1    Nov. 25, 2021

(30) Foreign Application Priority Data
May 25, 2020   (JP) .................................. 2020-090753

(51) Int. Cl.
| | | |
|---|---|---|
| *G03G 9/087* | (2006.01) | |
| *C08G 63/16* | (2006.01) | |
| *C08G 63/195* | (2006.01) | |
| *G03G 9/083* | (2006.01) | |

(52) U.S. Cl.
CPC ......... *G03G 9/08755* (2013.01); *C08G 63/16* (2013.01); *C08G 63/195* (2013.01); *G03G 9/083* (2013.01); *G03G 9/0874* (2013.01)

(58) Field of Classification Search
None
See application file for complete search history.

(56) References Cited

U.S. PATENT DOCUMENTS

| | | | | |
|---|---|---|---|---|
| 2014/0272696 | A1* | 9/2014 | Yamashita | ......... G03G 9/08795 430/108.4 |
| 2018/0224764 | A1* | 8/2018 | Nishitera | ........... G03G 9/08788 |

FOREIGN PATENT DOCUMENTS

JP    H05-066604 A    3/1993

* cited by examiner

*Primary Examiner* — Peter L Vajda
(74) *Attorney, Agent, or Firm* — Studebaker & Brackett PC

(57) ABSTRACT

A magnetic toner includes toner particles. The toner particles each include a toner mother particle. The toner mother particle includes a polyester resin domain, a vinyl resin domain, and a magnetic powder. A vinyl resin constituting the vinyl resin domain includes a repeating unit having a non-ring-opened oxazoline group. An area rate of an area in which the vinyl resin domain is exposed in a surface area of the toner mother particle is at least 0.02% and no greater than 1.00%.

6 Claims, 2 Drawing Sheets

MAGNETIC TONER

INCORPORATION BY REFERENCE

The present application claims priority under 35 U.S.C. § 119 to Japanese Patent Application No. 2020-090753, filed on May 25, 2020. The contents of the application are incorporated herein by reference in their entirety.

BACKGROUND

The present disclosure relates to a magnetic toner.

Toners used for electrostatic latent image development can be roughly divided into non-magnetic toners and magnetic toners. A non-magnetic toner is often mixed with a carrier to be used as a two-component developer for development. On the other hand, a magnetic toner is often directly used as a one-component developer for development.

The one-component developer involves storage of a larger amount of toner for a longer time in a development device than the two-component developer. Therefore, in development using the one-component developer, the magnetic toner is likely to be overcharged due to the prolonged mixing and stirring of the magnetic toner in the development device. Once the magnetic toner is overcharged, a phenomenon tends to occur in which a toner layer on a development sleeve becomes turbulent (hereinafter referred to as "layer turbulence"). Layer turbulence is particularly likely to occur in low-temperature and low-humidity environments. When layer turbulence occurs, an image defect (e.g., a wavy stripe pattern) is likely to be produced.

It is proposed for example to externally add an inorganic fine powder having a tertiary amino group to the surfaces of toner particles in order to ensure charge stability of a toner.

SUMMARY

A positively chargeable magnetic toner according to an aspect of the present disclosure includes toner particles. The toner particles each include a toner mother particle including a polyester resin domain, a vinyl resin domain, and a magnetic powder. A vinyl resin constituting the vinyl resin domain includes a repeating unit having a non-ring-opened oxazoline group. An area rate of an area in which the vinyl resin domain is exposed in a surface area of the toner mother particle is at least 0.02% and no greater than 1.00%.

DETAILED DESCRIPTION

Figure 1:
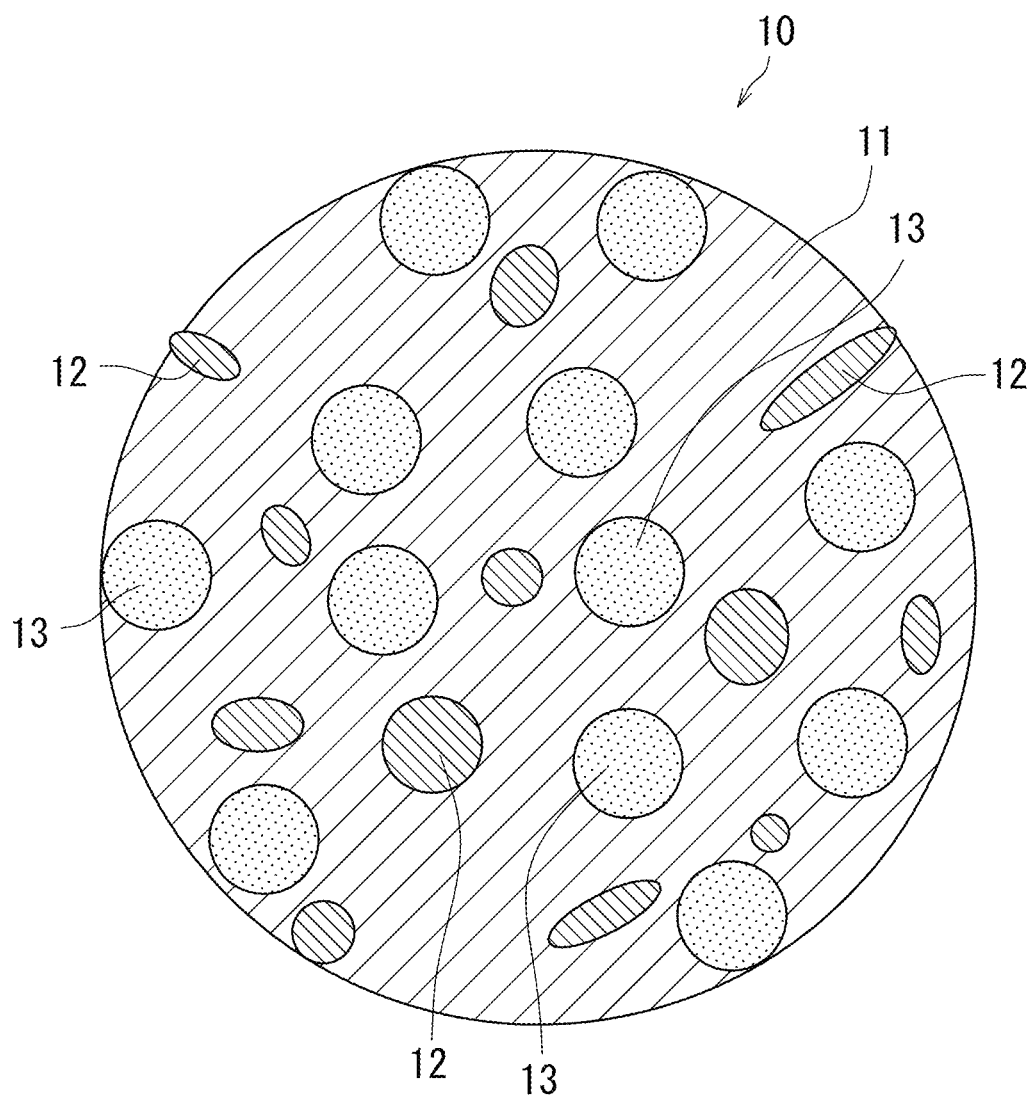
FIG. 1 is a diagram illustrating an example of a sectional structure of a toner mother particle included in a magnetic toner according to an embodiment of the present disclosure.

The following describes a preferable embodiment of the present disclosure. First, terms used herein will be described. A toner is an aggregate (e.g., a powder) of toner particles. An external additive is an aggregate (e.g., a powder) of external additive particles. A magnetic powder is an aggregate (e.g., a powder) of magnetic particles. Unless otherwise stated, evaluation results (e.g., values indicating shape and physical properties) of a powder (more specifically, a powder of toner particles, a powder of external additive particles, or a powder of magnetic particles) are each a number average of values measured with respect to an appropriate number of average particles selected from the powder.

Measurement values for volume median diameter ($D_{50}$) of particles (more specifically, a powder of the particles) are each a median diameter in terms of volume as measured using a laser diffraction/scattering particle size distribution analyzer ("LA-950", product of HORIBA, Ltd.) unless otherwise stated. Values for number average primary particle diameter of a powder are each a number average value of equivalent circle diameters of 100 primary particles of the powder (Heywood diameters: diameters of circles having the same areas as projected areas of the respective primary particles) as measured using a scanning electron microscope ("JSM-7401F", product of JEOL Ltd.) and image analysis software ("WinROOF", product of MITANI CORPORATION). Note that the number average primary particle diameter of particles refers to a number average primary particle diameter of the particles of a powder (number average primary particle diameter of the powder) unless otherwise stated.

Chargeability refers to chargeability in triboelectric charging unless otherwise stated. For example, a measurement target (e.g., a toner) is triboelectrically charged by mixing and stirring the measurement target and a standard carrier (standard carrier for negatively chargeable toner: N-01, standard carrier for positively chargeable toner: P-01) provided by the Imaging Society of Japan. The charge amount of a measurement target is measured before and after triboelectric charging using for example a suction type compact charge measurement device ("MODEL 212HS", product of TREK, INC.). The measurement target with a larger change in the charge amount before and after triboelectric charging indicates higher chargeability.

Measurement values for softening point (Tm) are values as measured using a capillary rheometer ("CFT-500D", product of Shimadzu Corporation) unless otherwise stated. On an S-shaped curve (vertical axis: temperature, horizontal axis: stroke) plotted using the capillary rheometer, the softening point (Tm) is a temperature corresponding to a value of "(base line stroke value+maximum stroke value)/2". Unless otherwise stated, measurement values for glass transition point (Tg) are values as measured in accordance with "Japanese Industrial Standards (JIS) K7121-2012" using a differential scanning calorimeter ("DSC-6220", product of Seiko Instruments Inc.). On a heat absorption curve (vertical axis: heat flow (DSC signals), horizontal axis: temperature) plotted using the differential scanning calorimeter, the glass transition point (Tg) is a temperature corresponding to a value at a point of variation due to glass transition (specifically, a temperature at an intersection point of an extrapolation of the base line and an extrapolation of the inclined portion of the curve).

Unless otherwise stated, a "main component" of a material is a component most included in the material in terms of mass.

Measurement values for acid value and hydroxyl value are values as measured in accordance with the neutralization titration method defined in "Japanese Industrial Standards (JIS) K0070-1992" unless otherwise stated.

Measurement values for number average molecular weight (Mn) and mass average molecular weight (Mw) are values as measured by gel permeation chromatography unless otherwise stated.

The words "an organic group (specific examples include an alkyl group) may be substituted with a phenyl group"

means that hydrogen atoms of the organic group may be partially or fully substituted with phenyl groups".

An "alkyl group having a carbon number of at least 1 and no greater than 6" is an unsubstituted straight chain or branched chain alkyl group. Examples of the alkyl group having a carbon number of at least 1 and no greater than 6 include a methyl group, an ethyl group, an n-propyl group, an isopropyl group, an n-butyl group, an s-butyl group, a t-butyl group, an n-pentyl group, an isopentyl group, a neopentyl group, and an n-hexyl group.

In the following, the term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. The term "(meth)acryl" is used as a generic term for both acryl and methacryl. A "vinyl resin" is a polymer of monomers (vinyl compounds) having a vinyl group ($CH_2=CH-$) or a group in which a hydrogen atom(s) in the vinyl group has been replaced.

<Magnetic Toner>

A positively chargeable magnetic toner according to the present embodiment (also referred to below simply as toner) can be favorably used for example for electrostatic latent image development. The toner according to the present embodiment can be used as a one-component developer. The toner according to the present embodiment is positively charged by friction with a development sleeve or a blade in a development device, for example.

Toner particles included in the toner of the present embodiment each include a toner mother particle including a polyester resin domain, a vinyl resin domain, and a magnetic powder. A vinyl resin constituting the vinyl resin domain includes a repeating unit having a non-ring-opened oxazoline group. An area rate of an area in which the vinyl resin domain is exposed in a surface area of the toner mother particle is at least 0.02% and no greater than 1.00%.

In the following, the area rate (unit: %) of an area in which the vinyl resin domain is exposed in the surface area of the toner mother particle may be referred to as "vinyl resin domain exposed area rate" or simply as "exposed area rate". The exposed area rate is measured by a method described later in association with Examples or a method equivalent thereto.

As a result of the toner according to the present embodiment having the above features, occurrence of layer turbulence can be inhibited in low-temperature and low-humidity environments while ensuring low-temperature fixability. Presumably, the reason for this is as follows.

The vinyl resin constituting the vinyl resin domain of the toner mother particle includes a repeating unit having a non-ring-opened oxazoline group in the present embodiment. A non-ring-opened oxazoline group exhibits high positive chargeability. Furthermore, the exposed area rate of the vinyl resin domain (domain having a non-ring-opened oxazoline group that exhibits high positive chargeability) is at least 0.02% and no greater than 1.00% in the present embodiment. As such, in the present embodiment, the positive charge amount of the toner can be stably kept even after the toner is mixed and stirred for a long time in a development device in a low-temperature and low-humidity environment. Therefore, the toner according to the present embodiment can inhibit occurrence of layer turbulence in low-temperature and low-humidity environments.

Study by the present inventor revealed that when the area rate of an area which the vinyl resin including the non-ring-opened oxazoline group occupies in the surface area of the toner mother particle is excessively high by contrast, it tends to be difficult to ensure low-temperature fixability of the toner. In the present embodiment, low-temperature fixability of the toner is ensured by setting the upper limit of the vinyl resin domain exposed area rate to 1.00%.

Therefore, the toner according to the present embodiment can inhibit occurrence of layer turbulence in low-temperature and low-humidity environments while ensuring low-temperature fixability.

In the present embodiment, in order to further inhibit occurrence of layer turbulence in low-temperature and low-humidity environments while further easily ensuring low temperature fixability, the amount of the non-ring-opened oxazoline group included in 1 g of the toner as measured by gas chromatography-mass spectrometry is preferably at least 0.10 µmol and no greater than 40.00 µmol, and more preferably at least 0.10 µmol and no greater than 36.60 µmol. In the following, the amount (unit: µmol) of a non-ring-opened oxazoline group included in 1 g of a toner as measured by gas chromatography-mass spectrometry may be referred to as "non-ring-opened oxazoline group content". The non-ring-opened oxazoline group content is measured by a method described later in association with Examples or a method equivalent thereto.

Each of the polyester resin domain and the vinyl resin domain is a domain of a binder resin in the present embodiment. That is, the toner mother particles contain a binder resin (domain of the binder resin) and a magnetic powder in the present embodiment. In the present embodiment, the toner mother particles may contain an internal additive other than the magnetic powder (e.g., at least one of a colorant, a releasing agent, and a charge control agent) according to necessity in addition to the binder resin and the magnetic powder.

The toner particles included in the toner of the present embodiment may further include an external additive. When the toner particles further include an external additive, the toner particles each include a toner mother particle and the external additive attached to the surface of the toner mother particle. Note that the external additive may be omitted if unnecessary. When the external additive is omitted, the toner mother particle is equivalent to the toner particle.

Details of the toner according to the present embodiment will be described below with reference to the accompanying drawings. FIG. 1 to be referenced schematically illustrates constituent elements in order to facilitate understanding. Properties such as size, number, and shape of each constituent element illustrated in the drawings may differ from actual properties in order to facilitate preparation of the drawings.

[Structure of Toner Particles]

The following describes a structure of the toner particles included in the toner of the present embodiment (specifically, a structure of the toner mother particles) with reference to FIG. 1. FIG. 1 is a diagram illustrating an example of a sectional structure of a toner mother particle included in the toner according to the present embodiment.

A toner mother particle 10 illustrated in FIG. 1 includes a polyester resin domain 11, a plurality of vinyl resin domains 12, and a magnetic powder. The magnetic powder is an aggregate of magnetic particles 13. A vinyl resin constituting the vinyl resin domains 12 includes a repeating unit having a non-ring-opened oxazoline group. The vinyl resin domains 12 have an exposed area rate of at least 0.02% and no greater than 1.00%.

In order to further inhibit occurrence of layer turbulence in low-temperature and low-humidity environments while further easily ensuring low-temperature fixability, it is preferable that the vinyl resin domains 12 have a domain diameter of at least 50 nm and no greater than 200 nm. Note that the domain diameter of the vinyl resin domains 12 is an arithmetic mean value of equivalent circle diameters (diameters of circles having the same area as the area of the cross-section of the vinyl resin domains 12) of 10 vinyl resin domains 12 present in a cross-sectional image of one toner mother particle 10 captured by a transmission electron microscopy. The domain diameter of the vinyl resin domains 12 can be adjusted for example by changing a preparation condition of the toner mother particles 10 (specific examples include a melt-kneading condition).

In order for the toner to be suitable for image formation, the toner mother particles 10 preferably have a volume median diameter ($D_{50}$) of at least 4 µm and no greater than 9 µm.

An example of the structure of the toner particles included in the toner of the present embodiment has been described so far with reference to FIG. 1.

[Constituent Elements of Toner Particles]

The following describes constituent elements of the toner particles included in the toner according to the present embodiment.

(Binder Resin)

For example, the binder resin accounts for at least 40% by mass of all the components of the toner mother particles. Accordingly, properties of the binder resin are thought to have a great influence on overall properties of the toner mother particles. Properties (specific examples include acid value) of the binder resin can be adjusted by using different resins in combination for the binder resin.

The toner mother particles contain as their binder resin a polyester resin constituting the polyester resin domain and a vinyl resin constituting the vinyl resin domain. In order to further inhibit occurrence of layer turbulence in low-temperature and low-humidity environments while further easily ensuring low-temperature fixability, the amount of the vinyl resin in the toner mother particles is preferably at least 0.01 parts by mass and no greater than 10 parts by mass relative to 100 parts by mass of the polyester resin in the toner mother particles, and more preferably at least 0.01 parts by mass and no greater than 5 parts by mass.

The toner mother particles may contain as their binder resin a resin other than the polyester resin and the vinyl resin. In order to further inhibit occurrence of layer turbulence in low-temperature and low-humidity environments while further easily ensuring low-temperature fixability, a total content ratio of the polyester resin and the vinyl resin in the toner mother particles is preferably at least 90% by mass and no greater than 100% by mass relative to the total amount of the binder resin, and particularly preferably 100% by mass.

The polyester resin and the vinyl resin contained in the toner mother particles are described below.

(Polyester Resin)

The polyester resin is obtained by condensation polymerization of one or more polyhydric alcohol compounds and one or more polybasic carboxylic acids. Examples of a polyhydric alcohol compound for synthesis of the polyester resin include dihydric alcohol compounds (specific examples include aliphatic diols and bisphenols) and tri- or higher-hydric alcohol compounds listed below. Examples of a polybasic carboxylic acid for synthesis of the polyester resin include dibasic carboxylic acids and tri- or higher-basic carboxylic acids listed below. Note that a polybasic carboxylic acid derivative that can form an ester bond through condensation polymerization (specific examples include anhydrides of polybasic carboxylic acids and halides of polybasic carboxylic acids) may be used instead of a polybasic carboxylic acid.

Preferable examples of the aliphatic diols include diethylene glycol, triethylene glycol, neopentyl glycol, 1,2-propanediol, α,ω-alkanediols (specific examples include ethylene glycol, 1,3-propanediol, 1,4-butanediol, 1,5-pentanediol, 1,6-hexanediol, 1,7-heptanediol, 1,8-octanediol, 1,9-nonanediol, and 1,12-dodecanediol), 2-butene-1,4-diol, 1,4-cyclohexanedimethanol, dipropylene glycol, polyethylene glycol, polypropylene glycol, and polytetramethylene glycol.

Preferable examples of the bisphenols include bisphenol A, hydrogenated bisphenol A, bisphenol A ethylene oxide adduct, and bisphenol A propylene oxide adduct.

Preferable examples of the tri- or higher-hydric alcohol compounds include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Preferable examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, 1,10-decanedicarboxylic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Preferable examples of the tri- or higher-basic carboxylic acids include trimellitic acid (1,2,4-benzenetricarboxylic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

In order to further inhibit occurrence of layer turbulence in low-temperature and low-humidity environments, the polyester resin constituting the polyester resin domain preferably includes a repeating unit derived from tri- or higher-basic carboxylic acid. Furthermore, in order to further inhibit occurrence of layer turbulence in low-temperature and low-humidity environments while further easily ensuring low-temperature fixability, the content ratio of the repeating unit derived from tri- or higher-basic carboxylic acid is preferably at least 0.5% by mole and no greater than 1.5% by mole relative to all repeating units derived from carboxylic acid in the polyester resin. In the following, the content ratio of the repeating unit derived from tri- or higher basic carboxylic acid to all the repeating units derived from carboxylic acid in the polyester resin may be referred to as a specific polybasic carboxylic acid unit content ratio. The specific polycarboxylic basic unit content ratio can be measured for example using a nuclear magnetic resonance (NMR) device.

In order to further inhibit occurrence of layer turbulence in low-temperature and low-humidity environments while further easily ensuring low-temperature fixability, it is preferable that the polyester resin constituting the polyester resin domain includes a repeating unit derived from trimellitic acid and the content ratio of the repeating unit derived from trimellitic acid to all the repeating units derived from carboxylic acid in the polyester resin is at least 0.5% by mole and no greater than 1.5% by mole.

In order to inhibit detachment of the vinyl resin domains from the toner mother particles, the acid value of the polyester resin constituting the polyester resin domain is preferably at least 10.0 mgKOH/g and no greater than 20.0 mgKOH/g or less, and more preferably at least 15.0 mgKOH/g and no greater than 17.0 mgKOH/g.

(Vinyl Resin)

The vinyl resin includes a repeating unit having a non-ring-opened oxazoline group. In order to further inhibit occurrence of layer turbulence in low-temperature and low-humidity environments, the repeating unit having an non-ring-opened oxazoline group is preferably a repeating unit represented by the following formula (1-1). In the following, the repeating unit represented by formula (1-1) below may be referred to as repeating unit (1-1).

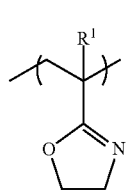

(1-1)

In formula (1-1), $R^1$ represents a hydrogen atom or an alkyl group having a carbon number of at least 1 and no greater than 6 and optionally substituted with a phenyl group. Preferable examples of $R^1$ include a hydrogen atom, a methyl group, an ethyl group, and an isopropyl group. In order to further inhibit occurrence of layer turbulence in low-temperature and low-humidity environments, $R^1$ preferably represents a hydrogen atom.

A vinyl resin including the repeating unit (1-1) is for example a polymer (resin) of monomers including at least a compound represented by the following formula (1) (also referred to below as compound (1)).

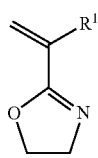

(1)

In formula (1), $R^1$ is the same as defined for $R^1$ in formula (1-1).

The polymer of monomers including at least the compound (1) may be a polymer obtained by copolymerization of the compound (1) and a vinyl compound (different vinyl compound) other than the compound (1). The vinyl compound can be a polymer (resin) through addition polymerization by carbon-to-carbon double bond (C=C) included in the vinyl group or the like.

In order to further inhibit occurrence of layer turbulence in low-temperature and low-humidity environments, the different vinyl compound is preferably one or more vinyl compounds selected from the group consisting of (meth)acrylic acid alkyl esters (more specifically, acrylic acid alkyl esters and methacrylic acid alkyl esters) and styrene-based monomers (more specifically, styrene).

The repeating unit (1-1) has a non-ring-opened oxazoline group. The non-ring-opened oxazoline group has a ring structure and exhibits high positive chargeability. The non-ring-opened oxazoline group readily reacts with a carboxy group, an aromatic sulfanyl group, or an aromatic hydroxyl group. For example, when the repeating unit (1-1) in the vinyl resin reacts with the carboxy group of the polyester resin in later-described toner mother particle preparation (more specifically, a melt-kneading process), the oxazoline group ring-opens to form an amide bond and an ester bond as illustrated in formula (1-2) below. These bonds formed as above strengthen the bond between the polyester resin domain and the vinyl resin domains to inhibit detachment of the vinyl resin domains from the toner mother particles. As a result, the toner can further inhibit occurrence of layer turbulence in low-temperature and low-humidity environments. Note that $R^1$ in formula (1-2) below is the same as defined for $R^1$ in formula (1-1). Also, * in formula (1-2) below represents a moiety bonded to an atom in the polyester resin constituting the polyester resin domain.

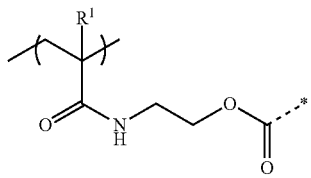

(1-2)

In order to inhibit detachment of the vinyl resin domains from the toner mother particles while stably maintaining positive chargeability of the toner, the vinyl resin preferably includes the repeating unit (1-1) and a repeating unit represented by formula (1-2) (also referred to below as repeating unit (1-2)). In the following, the resin including at least the repeating unit (1-1) and the repeating unit (1-2) may be referred to as a specific vinyl resin. In order to inhibit detachment of the vinyl resin domains from the toner mother particles while stably maintaining positive chargeability of the toner, the vinyl resin domain is preferably constituted by the specific vinyl resin (resin constituting the vinyl resin domain includes only the specific vinyl resin).

The higher the ratio (molar ratio) of the repeating unit (1-1) in the specific vinyl resin is, the higher positive chargeability of the specific vinyl resin (consequently, positive chargeability of the toner) tends to be. The higher the ratio (molar ratio) of the repeating unit (1-2) in the specific vinyl resin is by contrast, the stronger the bond between the polyester resin domain and the vinyl resin domain tends to be. The molar ratio between the repeating unit (1-1) and the repeating unit (1-2) in the specific vinyl resin can be adjusted for example by changing the acid value of the polyester resin constituting the polyester resin domain.

The following is an example of a method for confirming whether the oxazoline group is ring-opened in toner mother particle preparation to form the repeating unit (1-2). Specifically, a specific amount of the toner (sample) is dissolved in a solvent. The resultant solution was charged into a test tube for nuclear magnetic resonance (NMR) measurement, and a $^1$H-NMR spectrum is plotted using an NMR device. When the toner mother particles include the repeating unit (1-2), a triple line (triplet) signal originating from a secondary amide appears around a chemical shift δ of 6.5 in the $^1$H-NMR spectrum. Therefore, if a triple line signal is observed around a chemical shift δ of 6.5 in the plotted $^1$H-NMR spectrum, it is presumed that the oxazoline group was ring-opened during toner mother particle preparation to form the repeating unit (1-2). The following conditions are examples of conditions for $^1$H-NMR spectrum measurement.

(Conditions for $^1$H-NMR Spectrum Measurement)

NMR device: Fourier transform nuclear magnetic resonance (FT-NMR) device ("JNM-AL400", product of JEOL Ltd.)

Test tube for NMR measurement: 5-mm test tube

Solvent: Deuterated chloroform (1 mL)

Sample temperature: 20° C.

Mass of sample: 20 mg

Cumulative number of times: 128 times

Internal standard substance for chemical shift: Tetramethylsilane (TMS)

For example, an oxazoline group-containing polymer emulsion can be used as a raw material of the vinyl resin domain. Examples of a commercially available oxazoline group-containing polymer emulsion include "EPOCROS (Registered Japanese Trademark) K-2035E" produced by NIPPON SHOKUBAI CO., LTD., "EPOCROS (registered Japanese trademark) K-2030E" produced by NIPPON SHOKUBAI CO., LTD, and "APR-500" produced by GHEN MATERIALS LLC. "EPOCROS (registered Japanese trademark) K-2035E" and "EPOCROS (registered Japanese trademark) K-2030E" each include a copolymer of 2-vinyl-2-oxazoline (one type of the compound (1)), styrene, and an acrylic acid-based monomer. "APR-500" produced by GHEN MATERIALS LLC includes a copolymer of 2-vinyl-2-oxazoline (one type of the compound (1)) and an acrylic acid-based monomer.

In order to further inhibit occurrence of layer turbulence in low-temperature and low-humidity environments while further easily ensuring low-temperature fixability, it is preferable to satisfy the following condition 1 and more preferable to satisfy the following condition 2.

Condition 1: The vinyl resin constituting the vinyl resin domain is the specific vinyl resin and the non-ring-opened oxazoline group content is at least 0.10 µmol and no greater than 40.00 µmol.

Condition 2: The condition 1 is satisfied and the specific polybasic carboxylic acid unit content ratio is at least 0.5% by mole and no greater than 1.5% by mole.

(Magnetic Powder)

The toner mother particles include a magnetic powder. Magnetic particles included in the magnetic powder contain for example a magnetic material as a main component. Examples of the magnetic material include ferromagnetic metals (specific examples include iron, cobalt, and nickel), alloys thereof, oxides of ferromagnetic metals (specific examples include ferrite, magnetite, and chromium dioxide), and materials subjected to ferromagnetization (more specifically, carbon materials rendered ferromagnetic through thermal treatment).

In order to continuously form high-quality images, the magnetic particles are preferably particles containing magnetite as a main component, and more preferably particles constituted by magnetite (magnetite particles). Note that the magnetite particles may be treated with a surface treatment agent (e.g., hydrophobing agent).

In order to form high-quality images, the amount of the magnetic powder is preferably at least 50 parts by mass and no greater than 100 parts by mass relative to 100 parts by mass of the binder resin. In order to form high-quality images, it is also preferable that the average diameter of the magnetic particles included in the magnetic powder as measured by the BET method is at least 0.10 µm and no greater than 1.00 µm.

(Colorant)

The toner mother particles may contain a colorant. A black colorant may be used as a colorant, for example. Carbon black can for example be used as a black colorant. The amount of the colorant is preferably at least 1 part by mass and no greater than 20 parts by mass relative to 100 parts by mass of the binder resin in order to form high-quality images.

Furthermore, the aforementioned magnetic powder may be used as a black colorant. In other words, the magnetic powder may function as a black colorant. In this case, the content of the magnetic powder (component having a function as a black colorant and a function as a magnetic material) is preferably at least 50 parts by mass and no greater than 100 parts by mass relative to 100 parts by mass of the binder resin in order for the toner to be suitable for image formation.

(Releasing Agent)

The toner mother particles may contain a releasing agent. The releasing agent is for example used for the purpose of imparting excellent offset resistance to the toner. The amount of the releasing agent is preferably at least 1 part by mass and no greater than 20 parts by mass relative to 100 parts by mass of the binder resin in order that the toner has excellent offset resistance.

Examples of the releasing agent include ester waxes, polyolefin waxes (specific examples include polyethylene wax and polypropylene wax), microcrystalline wax, fluororesin wax, Fischer-Tropsch wax, paraffin wax, candelilla wax, montan wax, and castor wax. Examples of the ester waxes include natural ester waxes (specific examples include carnauba wax and rice wax) and synthetic ester waxes. One releasing agent may be used independently or two or more releasing agents may be used in combination in the present embodiment.

(Charge Control Agent)

The toner mother particles may contain a charge control agent. The charge control agent is used for the purpose of imparting excellent charge stability and an excellent charge rise characteristic to the toner, for example. The charge rise characteristic of the toner is an indicator as to whether or not the toner can be charged to a specific charging level in a short period of time.

When the toner mother particles contain a positively chargeable charge control agent, cationic strength (positive chargeability) of the toner mother particles can be increased.

Examples of the positively chargeable charge control agent include: azine compounds such as pyridazine, pyrimidine, pyrazine, 1,2-oxazine, 1,3-oxazine, 1,4-oxazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes such as Azine Fast Red FC, Azine Fast Red 12BK, Azine Violet BO, Azine Brown 3G, Azine Light Brown GR, Azine Dark Green BH/C, Azine Deep Black EW, and Azine Deep Black 3RL; acidic dyes such as Nigrosin BK, Nigrosin NB, and Nigrosin Z; alkoxylated amines; alkylamides; quaternary ammonium salts such as benzyl decylhexylmethylammonium chloride, decyltrimethylammonium chloride, 2-(methacryloyloxy)ethyl trimethylammonium chloride, and dimethylaminopropylacrylamide methyl chloride quaternary salt; and resins having a quaternary ammonium cationic group. One of the charge control agents listed above may be used independently or two or more of the charge control agents listed above may be used in combination.

The amount of the charge control agent is preferably at least 0.1 parts by mass and no greater than 20 parts by mass relative to 100 parts by mass of the binder resin in order that the toner has excellent charge stability.

(External Additive)

The toner particles may further contain an external additive. An example of an external additive addition method is a method by which external additive particles (powder) are attached to the surfaces of toner mother particles (powder) by stirring the toner mother particles and the external additive particles together.

Inorganic particles are preferable as the external additive particles, and silica particles or particles of a metal oxide (specific examples include alumina, titanium oxide, magnesium oxide, zinc oxide, strontium titanate, and barium titanate) are particularly preferable. Inorganic particles (powder) having a number average primary particle diameter of at least 5 nm and no greater than 50 nm are preferably used as the external additive particles in order that the toner has excellent fluidity. One type of external additive particle may be used independently or two or more types of external additive particle may be used in combination in the present embodiment.

In order to fully demonstrate the function of the external additive while inhibiting detachment of the external additive particles from the toner mother particles, it is preferable that the amount of the external additive (in the case where multiple types of external additive particles are used, the total amount of those external additive particles) is at least 0.5 parts by mass and no greater than 10 parts by mass relative to 100 parts by mass of the toner mother particles.

The external additive particles may be surface-treated. For example, in a situation in which silica particles are used as the external additive particles, either or both hydrophobicity and positive chargeability may be imparted to the surfaces of the silica particles with a surface treatment agent. Examples of the surface treatment agent include coupling agents (specific examples include a silane coupling agent, a titanate coupling agent, and an aluminate coupling agent), silazane compounds (specific examples include a chain silazane compound and a cyclic silazane compound), and silicone oils (specific examples include dimethyl silicone oil). One or more selected from the group consisting of the silane coupling agents and the silazane compounds are particularly preferable as the surface treatment agent. Preferable examples of the silane coupling agents include silane compounds (specific examples include methyltrimethoxysilane and aminosilane). Preferable examples of the silazane compounds include hexamethyldisilazane (HMDS). When the surface of a silica base (untreated silica particles) is treated with a surface treatment agent, a large number of hydroxyl groups (—OH) present on the surface of the silica base are partially or fully replaced with functional groups derived from the surface treatment agent. As a result, silica particles have the functional groups derived from the surface treatment agent (specifically, functional groups that are either or both more hydrophobic and more positively charged than the hydroxyl groups) on surfaces thereof.

<Toner Production Method>

The following describes a preferable production method of the toner according to the present embodiment.

[Toner Mother Particle Preparation]

First, the toner mother particles are prepared by an aggregation method or a pulverization method. The aggregation method involves for example an aggregation process and a coalescence process. In the aggregation process, fine particles containing components constituting the toner mother particles are caused to aggregate in an aqueous medium to form aggregated particles. In the coalescence process, the components contained in the aggregated particles are caused to coalesce in the aqueous medium to form toner mother particles.

The following describes the pulverization method. By the pulverization method, toner mother particles can be relatively easily prepared and production cost can be reduced. Toner mother particle preparation by the pulverization method involves for example a melt-kneading process and a pulverization process. The toner mother particle preparation may further involve a mixing process before the melt-kneading process. Also, the toner mother particle preparation may further involve at least one of a fine pulverization process and a classification process after the pulverization process.

In the mixing process, a mixture is obtained by mixing a polyester resin, an oxazoline group-containing polymer emulsion, a magnetic powder, and an internal additive optionally added as necessary. Each of the vinyl resin domain exposed area rate and the non-ring-opened oxazoline group content can be adjusted by for example changing the mass ratio between the polyester resin and the oxazoline group-containing polymer emulsion in obtaining the mixture. In the melt-kneading process, a melt-kneaded product is obtained by melting and kneading toner materials. The mixture obtained in the mixing process is used as the toner material, for example. The non-ring-opened oxazoline group content can also be adjusted by changing a condition for the melt-kneading process (specific examples include melt-kneading temperature). In the pulverization process, the resultant melt-kneaded product is cooled to for example room temperature (25°) and then pulverized to obtain a pulverized product. When it is necessary to reduce the diameter of the pulverized product obtained in the pulverization process, a process of further pulverizing the pulverized product may be performed (fine pulverization process). In addition, in order to uniform the particle diameter of the pulverized product, a process of classifying the resultant pulverized product (classification process) may be performed. Note that the melt-kneaded product may be classified while being pulverized in the pulverization process. Through the above processes, toner mother particles being a pulverized product are obtained.

[External Additive Addition]

Thereafter, as necessary, the obtained toner mother particles and an external additive are mixed using a mixer (e.g., an FM mixer produced by Nippon Coke & Engineering Co., Ltd.) to attach the external additive to the surfaces of the toner mother particles. Note that the toner mother particles may be used as toner particles without attaching the external additive to the toner mother particles. Through the above, the toner (a powder of the toner particles) according to the present embodiment is obtained.

EXAMPLES

Examples of the present disclosure will be described below. However, the present disclosure is not limited to the scope of Examples.

<Polyester Resin Synthesis>

The following describes respective methods for synthesizing polyester resins P-1 to P-3 each used as a polyester resin constituting a polyester resin domain.

[Synthesis of Polyester Resin P-1]

A four-necked flask equipped with a thermometer (thermocouple), a dewatering conduit, a nitrogen inlet tube, and a stirrer was set in a heating mantle. Subsequently, the flask was charged with 1245 g of terephthalic acid, 1245 g of isophthalic acid, 1248 g of an ethylene oxide adduct of bisphenol A (average number of moles added of ethylene oxide: 2 mol), and 744 g of ethylene glycol. Next, the internal atmosphere of the flask was changed to a nitrogen atmosphere, and then, the flask was heated while the flask contents were stirred until the internal temperature of the flask became 250° C. The flask contents were then allowed to react for 4 hours under a condition of a temperature of 250° C. Subsequently, 0.875 g of antimony trioxide, 0.548 g of triphenyl phosphate, and 0.102 g of tetra-n-butyl titanate were added into the flask. Next, the internal pressure of the flask was reduced to 8 kPa and the internal temperature of the flask was increased to 280° C. Then, the flask contents were allowed to react for 6 hours under a condition of a temperature of 280° C. Then, the internal pressure of the flask was returned to the standard pressure (101 kPa) and the internal temperature of the flask was reduced to 270° C. Thereafter, 30 g of trimellitic acid was added into the flask. Next, the flask contents were allowed to react for 1 hour under a condition of a temperature of 270° C. and then cooled, thereby obtaining a polyester resin P-1.

[Synthesis of Polyester Resin P-2]

A four-necked flask equipped with a thermometer (thermocouple), a dewatering conduit, a nitrogen inlet tube, and a stirrer was set in a heating mantle. Subsequently, the flask was charged with 1245 g of sebacic acid, 1245 g of 1,10-decanedicarboxylic acid, 1248 g of 1,4-butanediol, and 744 g of 1,6-hexanediol. Next, the internal atmosphere of the flask was changed to a nitrogen atmosphere, and then, the flask was heated while the flask contents were stirred until the internal temperature of the flask became 250° C. The flask contents were then allowed to react for 4 hours under a condition of a temperature of 250° C. Subsequently, 0.875 g of titanium (IV) methoxide, 0.548 g of bis(2-ethylhexyl) hydrogen phosphate, and 0.102 g of triphenyl phosphate were added into the flask. Next, the internal pressure of the flask was reduced to 8 kPa and the internal temperature of the flask was increased to 280° C. Then, the flask contents were caused to react for 6 hours under a condition of a temperature of 280° C. Then, the internal pressure of the flask was returned to the standard pressure (101 kPa) and the internal temperature of the flask was reduced to 270° C. Thereafter, 30 g of trimellitic acid was added into the flask. Next, the flask contents were caused to react for 1 hours under a condition of a temperature of 270° C., and then cooled, thereby obtaining a polyester resin P-2.

[Synthesis of Polyester Resin P-3]

A polyester resin P-3 was obtained by the same method as that for synthesis of the polyester resin P-1 in all aspects other than that the amount of trimellitic acid added into the flask was changed to 60 g.

Table 1 shows the content ratio of a repeating unit derived from trimellitic acid, Tg, Tm, Mn, Mw, molecular weight distribution (Mw/Mn), acid value, and hydroxyl value for each of the obtained polyester resins P-1 to P-3. Note that the content ratio of the repeating unit derived from trimellitic acid in Table 1 refers to a content ratio (unit: % by mole) of the repeating unit derived from trimellitic acid to all repeating units derived from carboxylic acid in the polyester resin. For example, the content ratio of the repeating unit derived from trimellitic acid in the polyester resin P-1 is a content ratio (unit: % by mole) of the repeating unit derived from trimellitic acid to total of a repeating unit derived from terephthalic acid, a repeating unit derived from isophthalic acid, and the repeating unit derived from trimellitic acid.

TABLE 1

|  | Polyester resin P-1 | Polyester resin P-2 | Polyester resin P-3 |
|---|---|---|---|
| Content ratio of repeating unit derived from trimellitic acid [% by mole] | 0.9 | 1.2 | 1.9 |
| Tg [° C.] | 53.8 | 52.6 | 55.4 |
| Tm [° C.] | 100.5 | 106.2 | 110.2 |
| Mn | 1295 | 1250 | 1350 |
| Mw | 14500 | 13500 | 16605 |
| Mw/Mn | 11.2 | 10.8 | 12.3 |
| Acid value [mgKOH/g] | 16.8 | 15.2 | 25.2 |
| Hydroxyl value [mgKOH/g] | 22.8 | 18.6 | 18.6 |

<Toner Production>

Methods for producing toners TA-1 to TA-7 and TB-1 to TB-3 will be described below.

[Production of Toner TA-1]

(Toner Mother Particle Preparation)

An FM mixer ("FM-20B", product of Nippon Coke & Engineering Co., Ltd.) was charged with 100 parts by mass of the polyester resin P-1, 90 parts by mass of magnetite particles ("TN-15", product of Mitsui Mining & Smelting CO., Ltd., average diameter by BET method: 0.17 μm), 10 parts by mass of a positively chargeable charge control agent ("ACRYBASE (registered Japanese trademark) FCA-201-PS", product of Fujikura Kasei Co., Ltd., component: resin having quaternary ammonium cationic group), 4 parts by mass of carnauba wax (product of TOA KASEI CO., LTD.) as a releasing agent, and 1 part by mass of an oxazoline group-containing polymer emulsion ("EPOCROS (registered Japanese trademark) K-2035E", product of NIPPON SHOKUBAI CO., LTD., solid concentration: 40% by mass). Next, the charged toner materials were mixed for 4 minutes using the FM mixer at a rotational speed of 200 rpm.

Subsequently, the resultant mixture was melt-kneaded using a twin screw extruder ("TEM-26SS", product of Toshiba Machine Co., Ltd.) under conditions of a material feeding speed of 50 g/minute, a shaft rotational speed of 100 rpm, and a cylinder temperature (melt-kneading temperature) of 100° C. The resultant melt-kneaded product was then cooled. Subsequently, the cooled melt-kneaded product was loaded into a jet mill ("MJT-1", product of HOSOKAWA MICRON COPORRATION), and then classified while being pulverized. As a result, toner mother particles with a volume median diameter ($D_{50}$) of 8 μm were obtained.

(External Additive Addition)

Next, 100 parts by mass of the toner mother particles obtained by the above-described method, 0.6 parts by mass of silica particles ("AEROSIL (registered Japanese trademark) RA200", product of Nippon Aerosil Co., Ltd., dry silica particles rendered hydrophobic and positively chargeable through surface treatment, surface treatment agent: hexamethildisilazane (HMDS) and aminosilane), and 0.8 parts by mass of titanium oxide particles ("EC-100", product of Titan Kogyo, Ltd., titanium oxide particles rendered conductive) were mixed for 5 minutes using an FM mixer ("FM-10B", product of Nippon Coke & Engineering Co., Ltd.) under conditions of a rotational speed of 3500 rpm and a jacket temperature of 20° C. Through the above, the entire amount of an external additive (silica particles and titanium oxide particles) was attached to the surfaces of the toner mother particles.

Next, the resultant powder was sifted using a 100-mesh sieve (opening 149 μm), thereby producing a toner TA-1 being a positively chargeable magnetic toner. Note that the composition ratio of the components constituting the toner was not changed between before and after the shifting.

[Production of Toner TA-2]

A toner TA-2 being a positively chargeable magnetic toner was produced according to the same method as that for production of the toner TA-1 in all aspects other than that 0.4 parts by mass of an oxazoline group-containing polymer emulsion ("APR-500", product of GHEN MATERIALS LLC, solid concentration: 39% by mass) was used instead of 1 part by mass of the oxazoline group-containing polymer emulsion ("EPOCROS (registered Japanese trademark) K-2035E", product of NIPPON SHOKUBAI CO., LTD., solid concentration: 40% by mass) in the toner mother particle preparation.

[Production of Toner TA-3]

A toner TA-3 being a positively chargeable magnetic toner was produced according to the same method as that for production of the toner TA-1 in all aspects other than that 1 part by mass of an oxazoline group-containing polymer emulsion ("EPOCROS (registered Japanese Trademark) K-2030E", product of NIPPON SHOKUBAI CO., LTD., solid concentration: 40% by mass) was used instead of 1 part by mass of the oxazoline group-containing polymer emulsion ("EPOCROS (registered Japanese trademark) K-2035E", product of NIPPON SHOKUBAI CO., LTD., solid concentration: 40% by mass) in the toner mother particle preparation.

[Production of Toner TA-4]

A toner TA-4 being a positively chargeable magnetic toner was produced according to the same method as that for production of the toner TA-1 in all aspects other than that the amount of the oxazoline group-containing polymer emulsion ("EPOCROS (registered Japanese Trademark) K-2035E", product of NIPPON SHOKUBAI CO., LTD., solid concentration: 40% by mass) loaded into the FM mixer was changed to 0.025 parts by mass in the toner mother particle preparation.

[Production of Toner TA-5]

A toner TA-5 being a positively chargeable magnetic toner was produced according to the same method as that for production of the toner TA-1 in all aspects other than that the amount of the oxazoline group-containing polymer emulsion ("EPOCROS (registered Japanese Trademark) K-2035E", product of NIPPON SHOKUBAI CO., LTD., solid concentration: 40% by mass) loaded into the FM mixer was changed to 10 parts by mass in the toner mother particle preparation.

[Production of Toner TA-6]

A toner TA-6 being a positively chargeable magnetic toner was produced according to the same method as that for production of the toner TA-1 in all aspects other than that 100 parts by mass of the polyester resin P-2 was used instead of 100 parts by mass of the polyester resin P-1 in the toner mother preparation.

[Production of Toner TA-7]

A toner TA-7 being a positively chargeable magnetic toner was produced according to the same method as that for production of the toner TA-1 in all aspects other than that 100 parts by mass of the polyester resin P-3 was used instead of 100 parts by mass of the polyester resin P-1 in the toner mother preparation.

[Production of Toner TB-1]

A toner TB-1 being a positively chargeable magnetic toner was produced according to the same method as that for production of the toner TA-1 in all aspects other than that the oxazoline group-containing polymer emulsion ("EPOCROS (registered Japanese trademark) K-2035E", product of NIPPON SHOKUBAI CO., LTD., solid concentration: 40% by mass) was not loaded into the FM mixer in the toner mother particle preparation.

[Production of Toner TB-2]

A toner TB-2 being a positively chargeable toner was produced according to the same method as that for production of the toner TA-1 in all aspects other than that the amount of the oxazoline group-containing polymer emulsion ("EPOCROS (registered Japanese trademark) K-2035E", product of NIPPON SHOKUBAI CO., LTD., solid concentration: 40% by mass) loaded into the FM mixer was changed to 0.0125 parts by mass in the toner mother preparation.

[Production of Toner TB-3]

A toner TB-3 being a positively chargeable toner was produced according to the same method as that for production of the toner TA-1 in all aspects other than that the amount of the oxazoline group-containing polymer emulsion ("EPOCROS (registered Japanese trademark) K-2035E", product of NIPPON SHOKUBAI CO., LTD., solid concentration: 40% by mass) loaded into the FM mixer was changed to 12 parts by mass in the toner mother preparation.

<Analysis of Vinyl Resin Domain>

Domain diameters of vinyl resin domains included in the respective toners TA-1 to TA-7 were measured using a transmission electron microscope (TEM, "H-7100FA", product of Hitachi High-Tech Corporation). The measurement result revealed that each domain diameter of the vinyl resin domains included in the toners TA-1 to TA-7 was at least 50 nm and no greater than 200 nm. Note that a thin sample piece having a section of a toner mother particle dyed with ruthenium was used as a sample for TEM observation for the measurement of the domain diameters of the vinyl resin domains. Furthermore, it was confirmed using a Fourier transform nuclear magnetic resonator (FT-NMR, "JNM-AL400", product of JEOL Ltd.) that the vinyl resin domains included in each of the toners TA-1 to TA-7 were constituted by the specific vinyl resin (constituted by only the specific vinyl resin).

<Measurement of Vinyl Resin Domain Exposed Area Rate>

First, 2.0 g of a toner being a measurement target (any of the toners TA-1 to TA-7 and TB-1 to TB-3) was dispersed in 100 g of an aqueous solution of a nonionic surfactant ("EMULGEN (registered Japanese trademark) 120", product of Kao Corporation, component: polyoxyethylene lauryl ether) at a concentration of 2% by mass to obtain a toner dispersion. Ultrasonic treatment was performed on the resultant toner dispersion for 5 minutes using an ultrasonic disperser ("ULTRASONIC MINI WELDER P128", product of ULTRASONIC ENGINEERING CO., LTD., output: 100 W, oscillation frequency: 28 kHz). Subsequently, the toner dispersion subjected to the ultrasonic treatment was filtered by suction using a quantitative paper filter ("FILTER PAPER No. 1", product of ADVANTEC MFS, INC.). Thereafter, re-slurry by adding 50 mL of ion exchange water to the filtrate and filtration by suction were repeated three times to obtain a toner (toner mother particles) from which the external additive had been removed.

Figure 2:
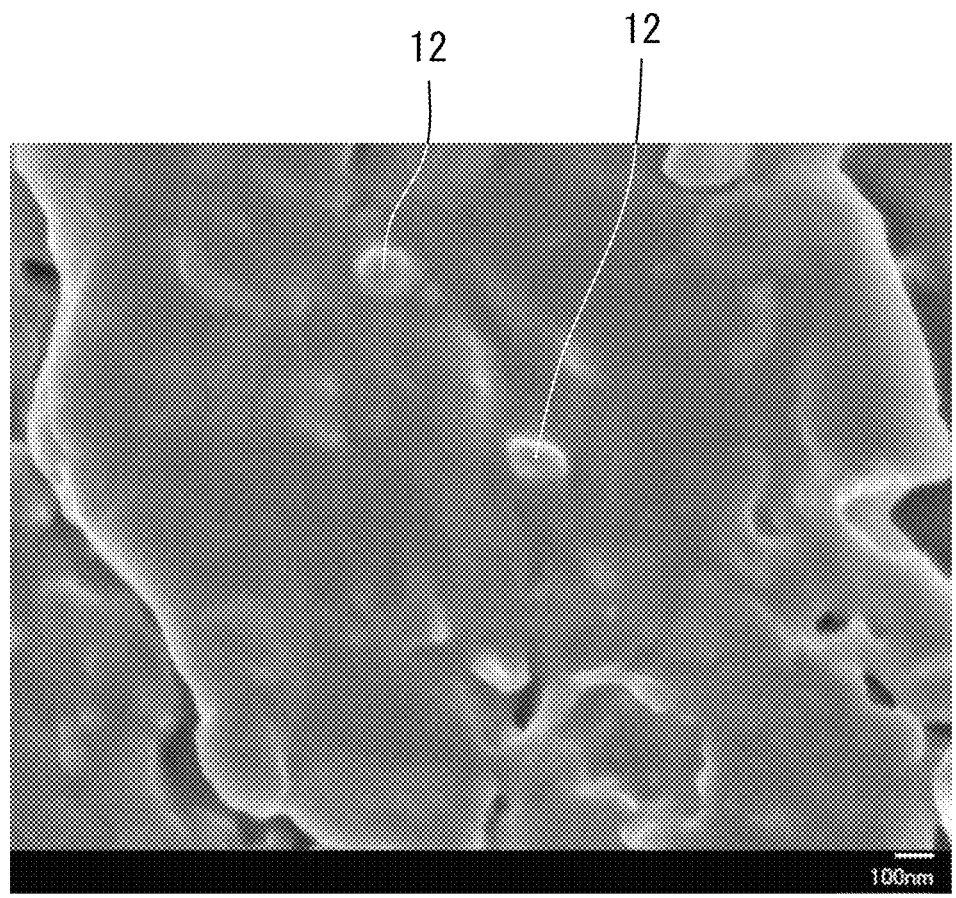
FIG. 2 is a scanning electron micrograph showing an example of the surface of a toner mother particle included in the magnetic toner according to the embodiment.

Next, the obtained toner mother particles were dried and then exposed to a vapor of an aqueous ruthenium tetroxide solution (concentration 0.5% by mass) in an atmosphere at a temperature of 25° C. for 10 minutes to be dyed. The dyed toner mother particles were then captured at a magnification of 50000× using a scanning electron microscope ("JSM-7401F", product of JEOL Ltd.) to obtain secondary electron images of randomly selected 10 toner mother particles. FIG. 2 shows an example of the secondary electron images of the toner mother particles. As shown in FIG. 2, the vinyl resin domains 12 were exposed at the surface of a toner mother particle.

After obtaining the secondary electron images, the vinyl resin domain exposed area rate was measured for each of the 10 toner mother particles using image analysis software ("WinROOF", product of MITANI CORPORATION). The exposed area rate was calculated based on a formula "(exposed area rate)=100×(area of part in which vinyl resin domain is exposed)/(total area of area of part in which vinyl resin domain is exposed and area of part in which vinyl resin domain is not exposed)". Then, an arithmetic mean of the 10 determined values was taken to be an evaluation value (vinyl resin domain exposed area rate) of a toner being a measurement target.

<Measurement of Non-Ring-Opened Oxazoline Group Content>

The non-ring-opened oxazoline group content of each of the toners TA-1 to TA-7 and TB-1 to TB-3 was measured by gas chromatography-mass spectrometry (GC/MS). In the GC/MS, a gas chromatograph mass spectrometer ("GCMS-QP2010 ULTRA", product of Shimadzu Corporation) and a multi-shot pyrolyzer ("FRONTIER LAB MULTI-FUNCTIONAL PYROLYZER (registered Japanese trademark) PY-3030D", product of Frontier Laboratories Ltd.) were used each as a measuring device. A column used was a GC column ("AGILENT (registered Japanese trademark) J & W Ultra Inert Capillary GC Column DB-5 ms", product of Agilent Technologies Japan, Ltd., phase: arylene phase with a polymer main chain strengthened by introducing arylene to siloxane polymer, inner diameter: 0.25 mm, thickness: 0.25 μm, length: 30 m). Respective conditions for the gas chromatography and the mass spectrometric measurement are shown below.

[Conditions for Gas Chromatography]
Carrier gas: Helium (He) gas
Carrier flow rate: 1 mL/minute
Vaporization chamber temperature: 210° C.
Thermal decomposition temperature: Heating furnace "600° C.", interface portion "320° C."
Heating conditions: Kept at 40° C. for 3 minutes, increased from 40° C. to 300° C. at a rate of 10° C./minute, and then kept at 300° C. for 15 minutes

[Conditions for Mass Spectrometric Measurement]
Ionization method: Electron impact (EI) method
Ion source temperature: 200° C.
Temperature of interface portion: 320° C.
Detection mode: Scan (measurement range: from 45 m/z to 500 m/z)

A peak originating from a non-ring-opened oxazoline group was identified through analysis of a mass spectrum plotted under the above conditions, and a content of the ring-opened oxazoline group included in the measurement target (toner) (amount of non-ring-opened oxazoline group included in 1 g of toner) was obtained based on the peak surface area of the measured chromatogram. Quantification of the non-ring-opened oxazoline group content was performed using a calibration curve.

Table 2 shows the vinyl resin domain exposed area rate and the non-ring-opened oxazoline group content of each of the toners TA-1 to TA-7 and TB-1 to TB-3.

TABLE 2

| Toner | Exposed area rate [%] | Non-ring-opened oxazoline group content [μmol] |
|---|---|---|
| TA-1 | 0.09 | 3.50 |
| TA-2 | 0.09 | 3.70 |
| TA-3 | 0.08 | 4.00 |
| TA-4 | 0.02 | 0.10 |
| TA-5 | 0.92 | 36.60 |
| TA-6 | 0.08 | 3.25 |
| TA-7 | 0.08 | 3.80 |
| TB-1 | 0.00 | 0.00 |
| TB-2 | 0.01 | 0.05 |
| TB-3 | 1.10 | 45.60 |

<Evaluation Method>
Methods for evaluating each of the toners TA-1 to TA-7 and TB-1 to TB-3 will be described below.

[Image Density]
An evaluation apparatus used was a monochrome printer ("ECOSYS (registered Japanese trademark) LS-4200DN", product of KYOCERA Document Solutions Inc.). The toner (evaluation target: any of the toners TA-1 to TA-7 and TB-1 to TB-3) was loaded into a development device and a toner container of the evaluation apparatus. Next, a solid image with a size of 25 mm by 25 mm was printed on a sheet of printing paper (A4-size plain paper, basis weight: 80 g/m$^2$) using the evaluation apparatus under environmental conditions of a temperature of 23° C. and a relative humidity of 55%. Next, the image density (ID) of the printed solid image was measured using a whiteness level meter ("TC-6D", product of Tokyo Denshoku Co., Ltd.). The solid image was evaluated as "good" if the measured image density (ID) was at least 1.10 and evaluated as "poor" if the measured image density (ID) was less than 1.10.

[Minimum Fixable Temperature]
An evaluation apparatus used was an image forming apparatus that was a monochrome printer ("ECOSYS (registered Japanese trademark) LS-4200DN", product of KYOCERA Document Solutions Inc.) modified to be changeable in fixing temperature. The toner (evaluation target: any of the toners TA-1 to TA-7 and TB-1 to TB-3) was loaded into a development device and a toner container of the evaluation apparatus. Next, a solid image with a size of 25 mm by 25 mm (specifically, an unfixed toner image before passing through a fixing device) was formed on printing paper (A4-size plain paper) with a basis weight of 80 g/m$^2$ using the evaluation apparatus under environmental conditions of a temperature of 23° C. and a relative humidity of 55%.

Subsequently, the printing paper with the solid image formed thereon was made to pass through the fixing device of the evaluation apparatus. At that time, while the fixing temperature of the fixing device was increased from 170° C. in increments of 1° C., fixability at each fixing temperature was determined to measure the minimum temperature (lowest fixing temperature) at which the solid image (toner image) was fixed to the printing paper.

Whether or not the toner was fixed was confirmed by the following rubbing test. Specifically, the image density of the solid image on the printing paper having passed through the fixing device (also referred to below as pre-rubbing ID) was measured using a whiteness level meter ("TC-6D", product of Tokyo Denshoku Co., Ltd.). Subsequently, using a 1-kg weight covered with fabric, the image on the printing paper was rubbed 10 times back and forth so that only the weight of the weight was applied to the printing paper. Then, the image density of the solid image on the printing paper (hereinafter referred to as "post-rubbing ID") was measured using the whiteness level meter ("TC-6D", product of Tokyo Denshoku Co., Ltd.). Next, the fixing rate (unit: %) was calculated using a formula "(fixing rate)=100×(post-rubbing ID)/(pre-rubbing ID)". The lowest temperature among the fixing temperatures at which the fixing rate was 90% or higher was taken to be a minimum fixing temperature. It was evaluated that "low-temperature fixability was ensured" if the minimum fixable temperature was 225° C. or lower, and evaluated that "low-temperature fixability was not ensured" if the minimum fixable temperature exceeded 225° C.

[Charge Amount]

An evaluation apparatus used was a monochrome printer ("ECOSYS (registered Japanese trademark) LS-4200DN", product of KYOCERA Document Solutions Inc.). The toner (evaluation target: any of the toners TA-1 to TA-7 and TB-1 to TB-3) was loaded into a development device and a toner container of the evaluation apparatus. Next, the development device of the evaluation apparatus was run for 5 minutes under environmental conditions of a temperature of 23° C. and a relative humidity of 55%, and then taken out of the evaluation apparatus. Subsequently, under environmental conditions of a temperature of 23° C. and a relative humidity of 55%, toner adhering to a development sleeve of the development device was sucked using a compact toner draw-off charge measurement system ("MODEL 212HS", product of TREK Inc.), and the charge amount (unit: μC/g) of the sucked toner was measured. The toner was evaluated as "good" if the measured charge amount was at least 7.9 μC/g, and evaluated as "poor" if the measured charge amount was less than 7.9 μC/g.

[Layer Turbulence]

An evaluation apparatus used was a monochrome printer ("ECOSYS (registered Japanese trademark) LS-4200DN", product of KYOCERA Document Solutions Inc.). The toner (evaluation target: any of the toners TA-1 to TA-7 and TB-1 to TB-3) was loaded into a development device and a toner container of the evaluation apparatus. Next, using the evaluation apparatus under environmental conditions of a temperature of 10° C. and a relative humidity of 10%, a character image with a printing rate of 3% was printed on 10,000 sheets of printing paper (A4-size plain paper, basis weight: 80 g/m$^2$), and then, a solid image with a size of 25 mm by 25 mm was printed on a sheet of printing paper (A4-size plain paper, basis weight: 80 g/m$^2$). Subsequently, the printed solid image was visually observed for determination in accordance with the following criteria. It was evaluated that "occurrence of layer turbulence in low-temperature and low-humidity environments was inhibited" if the determination result was evaluated as A. It was evaluated that "occurrence of layer turbulence in low-temperature and low-humidity environments was not inhibited" if the determination result was evaluated as B by contrast.

(Determination Criteria)

A: Image defect resulting from occurrence of layer turbulence was not confirmed.

B: Image defect resulting from occurrence of layer turbulence was confirmed.

<Evaluation Result>

Table 3 shows determination results of image density, minimum fixable temperature, charge amount, and layer turbulence for each of the toners TA-1 to TA-7 and TB-1 to TB-3.

TABLE 3

| | Toner | Image density | Minimum fixable temperature [° C.] | Charge amount [μC/g] | Determination result of layer turbulence |
|---|---|---|---|---|---|
| Example 1 | TA-1 | 1.22 | 195 | 8.5 | A |
| Example 2 | TA-2 | 1.22 | 195 | 7.9 | A |
| Example 3 | TA-3 | 1.21 | 195 | 8.2 | A |
| Example 4 | TA-4 | 1.22 | 195 | 8.2 | A |
| Example 5 | TA-5 | 1.23 | 220 | 9.2 | A |
| Example 6 | TA-6 | 1.23 | 220 | 8.2 | A |
| Example 7 | TA-7 | 1.25 | 225 | 9.6 | A |
| Comparative Example 1 | TB-1 | 1.21 | 195 | 8.3 | B |
| Comparative Example 2 | TB-2 | 1.22 | 195 | 8.2 | B |
| Comparative Example 3 | TB-3 | 1.22 | 230 | 9.6 | A |

Each of the toners TA-1 to TA-7 included toner mother particles each including a polyester resin domain, a vinyl resin domain, and a magnetic powder. In the toners TA-1 to TA-7, the vinyl resin constituting the vinyl resin domain included a repeating unit having a non-ring-opened oxazoline group. As shown in Table 2, the vinyl resin domain exposed area rate of each of the toners TA-1 to TA-7 was at least 0.02% and no greater than 1.00%.

As shown in Table 3, each of the toners TA-1 to TA-7 had a minimum fixable temperature of 225° C. or lower. As such, the toners TA-1 to TA-7 ensured low-temperature fixability. The toners TA-1 to TA-7 were evaluated as A in determination of layer turbulence. As such, the toners TA-1 to TA-7 inhibited occurrence of layer turbulence in low-temperature and low-humidity environments.

The toner TB-1 included toner mother particles including no vinyl resin domain. As shown in Table 2, the toner TB-2 had a vinyl resin domain exposed area rate of less than 0.02%. The toner TB-3 had a vinyl resin domain exposed area rate of higher than 1.00%.

As shown in Table 3, the toners TB-1 and TB-2 were evaluated as B in determination of layer turbulence. As such, the toners TB-1 and TB-2 did not inhibit occurrence of layer turbulence in low-temperature and low-humidity environments. The toner TB-3 had a minimum fixable temperature of higher than 225° C. As such, the toner TB-3 did not ensure low-temperature fixability.

From the results described above, it was demonstrated that the magnetic toner according to the present disclosure can inhibit occurrence of layer turbulence in low-temperature and low-humidity environments while ensuring low-temperature fixability.

What is claimed is:

1. A positively chargeable magnetic toner comprising toner particles, wherein
the toner particles each include a toner mother particle including a polyester resin domain, a vinyl resin domain, and a magnetic powder, a vinyl resin constituting the vinyl resin domain includes a repeating unit having a non-ring-opened oxazoline group, a polyester resin constituting the polyester resin domain includes a repeating unit derived from tri- or higher-basic carboxylic acid, the repeating unit derived from the tri- or higher-basic carboxylic acid has a content ratio to all repeating units derived from carboxylic acid in the polyester resin of at least 0.5% by mole and no greater than 1.5% by mole, an area rate of an area in which the vinyl resin domain is exposed in a surface area of the toner mother particle is at least 0.02% and no greater than 1.00%, and the magnetic toner is used as a one-component developer.

2. The magnetic toner according to claim 1, wherein the repeating unit having the non-ring-opened oxazoline group is a repeating unit represented by formula (1-1):

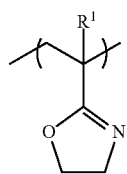

(1-1)

where in the formula (1-1), $R^1$ represents a hydrogen atom or an alkyl group having a carbon number of at least 1 and no greater than 6 and optionally substituted with a phenyl group.

3. The magnetic toner according to claim 2, wherein the vinyl resin constituting the vinyl resin domain further includes a repeating unit represented by formula (1-2):

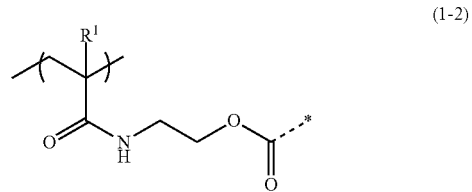

(1-2)

where in the formula (1-2), $R^1$ is the same as defined for $R^1$ in the formula (1-1), and \* represents a moiety that is bonded to an atom in a polyester resin constituting the polyester resin domain.

4. The magnetic toner according to claim 1, wherein an amount of the non-ring-opened oxazoline group included in 1 g of the magnetic toner as measured by gas chromatography is at least 0.10 µmol and no greater than 40.00 µmol.

5. The magnetic toner according to claim 1, wherein the repeating unit derived from the tri- or higher-basic carboxylic acid is a repeating unit derived from trimellitic acid.

6. The magnetic toner according to claim 1, wherein the polyester resin constituting the polyester resin domain has an acid value of at least 10.0 mgKOH/g and no greater than 20.0 mgKOH/g.

\* \* \* \* \*